United States Patent [19]

Nose et al.

[11] Patent Number: 5,150,035
[45] Date of Patent: Sep. 22, 1992

[54] ENCODER HAVING ATOMIC OR MOLECULAR STRUCTURE REFERENCE SCALE

[75] Inventors: Hiroyasu Nose, Zama; Toshimitsu Kawase, Atsugi; Tohsihiko Miyazaki, Isehara; Takahiro Oguchi, Atsugi; Akihiko Yamano, Yokohama, all of Japan

[73] Assignee: Canon Kabushiki Kaisha, Tokyo, Japan

[21] Appl. No.: 515,872

[22] Filed: Apr. 27, 1990

[30] Foreign Application Priority Data

Apr. 27, 1989 [JP] Japan ................................. 1-105889

[51] Int. Cl.⁵ .......................................... G01N 27/00
[52] U.S. Cl. ................... 324/71.1; 250/306; 359/78
[58] Field of Search ........... 324/71.1; 340/870.28; 250/306; 350/341; 359/78

[56] References Cited

U.S. PATENT DOCUMENTS

| | | | |
|---|---|---|---|
| 4,674,436 | 6/1987 | Miyazaki et al. | 118/402 |
| 4,785,762 | 11/1988 | Miyazaki et al. | 118/402 |
| 4,835,083 | 5/1989 | Sakai et al. | 430/130 |
| 4,840,821 | 6/1989 | Miyazaki et al. | 427/430.1 |
| 4,939,363 | 7/1990 | Bando et al. | 250/306 |
| 5,001,409 | 3/1991 | Hosaka et al. | 250/306 X |
| 5,019,707 | 5/1991 | Chiu et al. | 250/306 |

FOREIGN PATENT DOCUMENTS 0304893 3/1989 European Pat. Off. .
62-209302 9/1987 Japan .

OTHER PUBLICATIONS

"Surface Studies by Scanning Tunneling Microscopy", by G. Binning et al., Physical Review, vol. 49, No. 1 Jul 5, 1982, pp. 57-60.

Primary Examiner—Kenneth A. Wieder
Assistant Examiner—Glenn W. Brown
Attorney, Agent, or Firm—Fitzpatrick, Cella, Harper & Scinto

[57] ABSTRACT

An encoder has a reference scale having periodic structure of atoms or molecules in a predetermined direction, a probe disposed in opposed relationship with the reference scale, the probe being used to detect the structural variation information of the periodic structure of the reference scale, and relative displacement amount detecting means for detecting the amount of relative displacement of the reference scale and the probe along a predetermined direction from the structural variation information obtained by the probe.

29 Claims, 7 Drawing Sheets

ENCODER HAVING ATOMIC OR MOLECULAR STRUCTURE REFERENCE SCALE

BACKGROUND OF THE INVENTION

This invention relates to an encoder for use for positional information measurement in fine positioning, dimension measurement, distance measurement, speed measurement, etc., and particularly for measurement control requiring a resolving power of the atomic order (0.1 nanometer).

Heretofore, this kind of encoder has comprised of a reference scale having information regarding a position or an angle, and detecting means moved relative thereto to detect the information regarding a position or an angle. The encoder has been classified into several types, for example, optical encoder, magnetic encoder, electrostatic capacity encoder, etc. with respect to types of reference scale and detecting means.

However, among the encoders of the prior art mentioned above which have been put into practical use, the performance (resolving power) of a grating interference optical encoder is determined chiefly by grating pitch, and it is important to form the pitch accurately at minute intervals and detect it accurately. In present day precision processing technique (for example, election beana lithography or ion beam processing), the limit of accuracy is 10 nanometers at best, and also in the detection technique (for example, the optical heterodyne method), the limit of the resolving power is 10 nanometers. Accordingly, where an encoder of higher resolving power is required for a semiconductor manufacturing apparatus or the like, it has been impossible to meet the requirement.

As a conventional displacement amount detecting method, there is one using a tunnel current.

The displacement amount detecting method using a tunnel current utilizes the principle of a scanning tunneling microscope (hereinafter abbreviated as STM) STM can obtain various types of information regarding the shape of the surface of electrically conductive matter and the distribution of electrons therein with a lateral resolving power of 0.1 nanometer and a vertical resolving power of 0.01 nanometer by applying a voltage between an electrically conductive probe and electrically conductive matter brought close to each other to a distance of the order of 1 nanometer, and detecting a flowing tunnel current [G. Binnig et al., Phys, Rev Sett. 49 (1982) 57]. So a probe (electrode needle 701) and a reference scale (a single crystal 702) in which atoms 703 arranged facing each other in proximity as shown in FIG. 1 of the accompanying drawings are provided on two bodies producing a relative displacement, and a voltage is applied thereto to flow a tunnel current and at that time, a potential change accompanied by a tunnel current change produced by the relative displacement of the two bodies when the tip end of the probe scans the reference scale is detected by a potential measuring device 704, whereby the amount of relative displacement can be detected.

FIG. 2 of the accompanying drawings is a block diagram showing the construction of a positioning stage using such displacement amount detecting device. The reference numeral 704 designates the electric potential measuring device shown in FIG. 1, the reference numeral 805 denotes a stage, the reference numerals 806 and 807 designate devices for driving the stage 805 in the X direction and the Y direction, respectively, the reference numeral 808 denotes a device for computing the moving ratio of the stage 805 in the X and Y directions from the amounts of drive of the driving devices 806 and 807, the reference numeral 809 designates a device for computing the amount of movement of the stage 805 at the atom unit from the outputs of the computing device 808 and the electric potential measuring device 704, the reference numeral 810 denotes a device for displaying the amounts of movement in the X and Y directions which are the result of the computation of the computing device 809, and the reference numeral 811 designates means for sending a control signal to the driving devices 806 and 807 on the basis of the result of the computation of the computing device 809.

In this example of the prior art, a single crystal having a two-dimensional atomic arrangement is used as the reference scale and therefore, unless as shown in FIG. 2, the amounts of drive in both X and Y directions, respectively, are examined, the amount of movement in each direction cannot be detected accurately, and the apparatus as an encoder is complicated.

Also, where use is made of a two-dimensional reference scale as shown in the upper stage of FIG. 3 of the accompanying drawings, when the angular shifting $\Delta\theta$ (9B) and the lateral shifting $\Delta Y$ (9C) between the direction of relative displacement and the axis of the scale as shown in FIG. 3 are caused by the mounting error of the scale and disturbances such as vibration and temperature drift, the waveform of the tunnel current varies as shown and this results in a detection error in the amount of relative displacement.

SUMMARY OF THE INVENTION

In view of the above-noted problems peculiar to the prior art, it is an object of the present invention to provide an encoder which is high in resolving power, can accomplish measurement without the driving information of driving means and which is stable and highly accurate for the local defect and error of a reference scale and distrurbances such as vibration and temperature drift.

Other objects of the present invention will become apparent from the following detailed description of some embodiments of the invention.

DESCRIPTION OF THE PREFERRED EMBODIMENTS

The encoder of an embodiment which will be described later is provided with an electrically conductive one-dimensional reference scale which provides the reference regarding length, an electrically conductive probe disposed with its tip end brought close to the surface of the reference scale, means for applying a voltage between the reference scale and the probe, means for detecting a tunnel current flowing between the reference scale and the probe, and means for detecting the amount of relative displacement of the reference scale and the probe on the basis of the tunnel current detected by said detecting means.

The one-dimensional reference scale may be, for example, one using an electrically conductive substrate and a molecule oriented film on the substrate as will be described later, and as the molecule oriented film, use may be made of liquid crystal molecule oriented films or J-associated organic molecule Langmuir Blodgett's films.

Further, as the one-dimensional reference scale, use can also be made of surfaces wherein two or more kinds of electrically conductive materials laminated alternately are cut in a plane containing the direction of layering, or one which comprises a plurality of one-dimensional scales which differ in the direction of scale and in which the relative displacement amount detecting means detects the amount of two-dimensional relative displacement of the scales and the probe.

Figure 1:
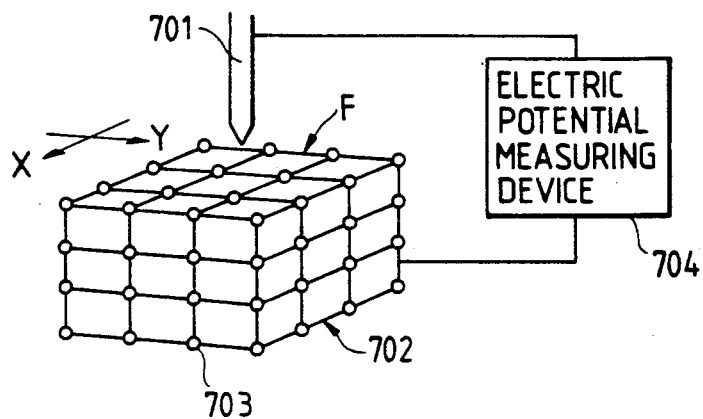
FIGS. 1 and 2 are a schematic view and a block diagram, respectively, showing a parallel movement amount detecting apparatus of the conventional type.
Figure 2:
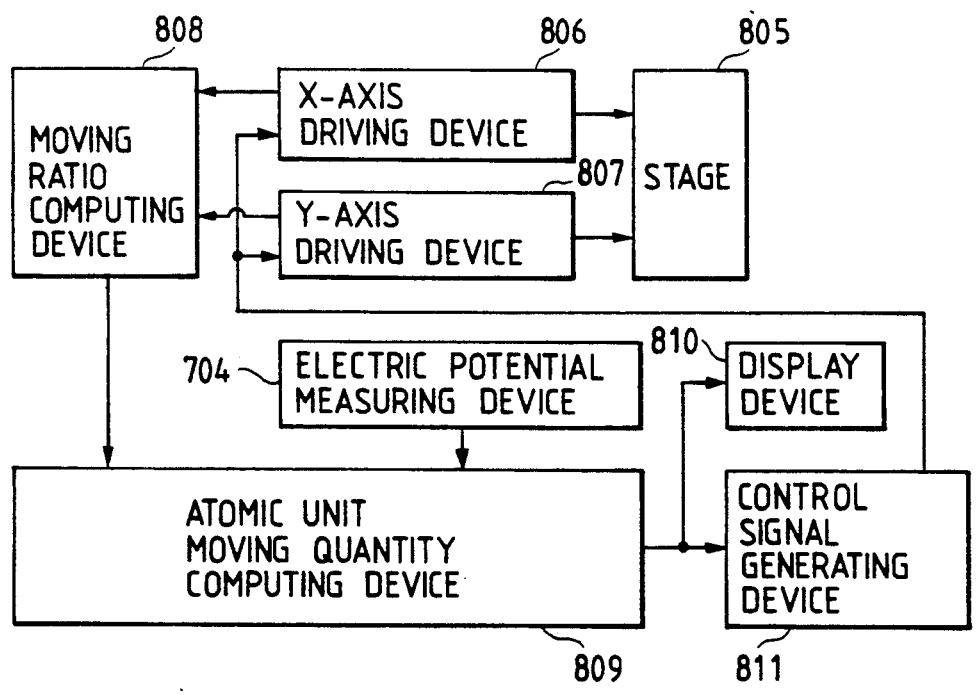
Figure 3:
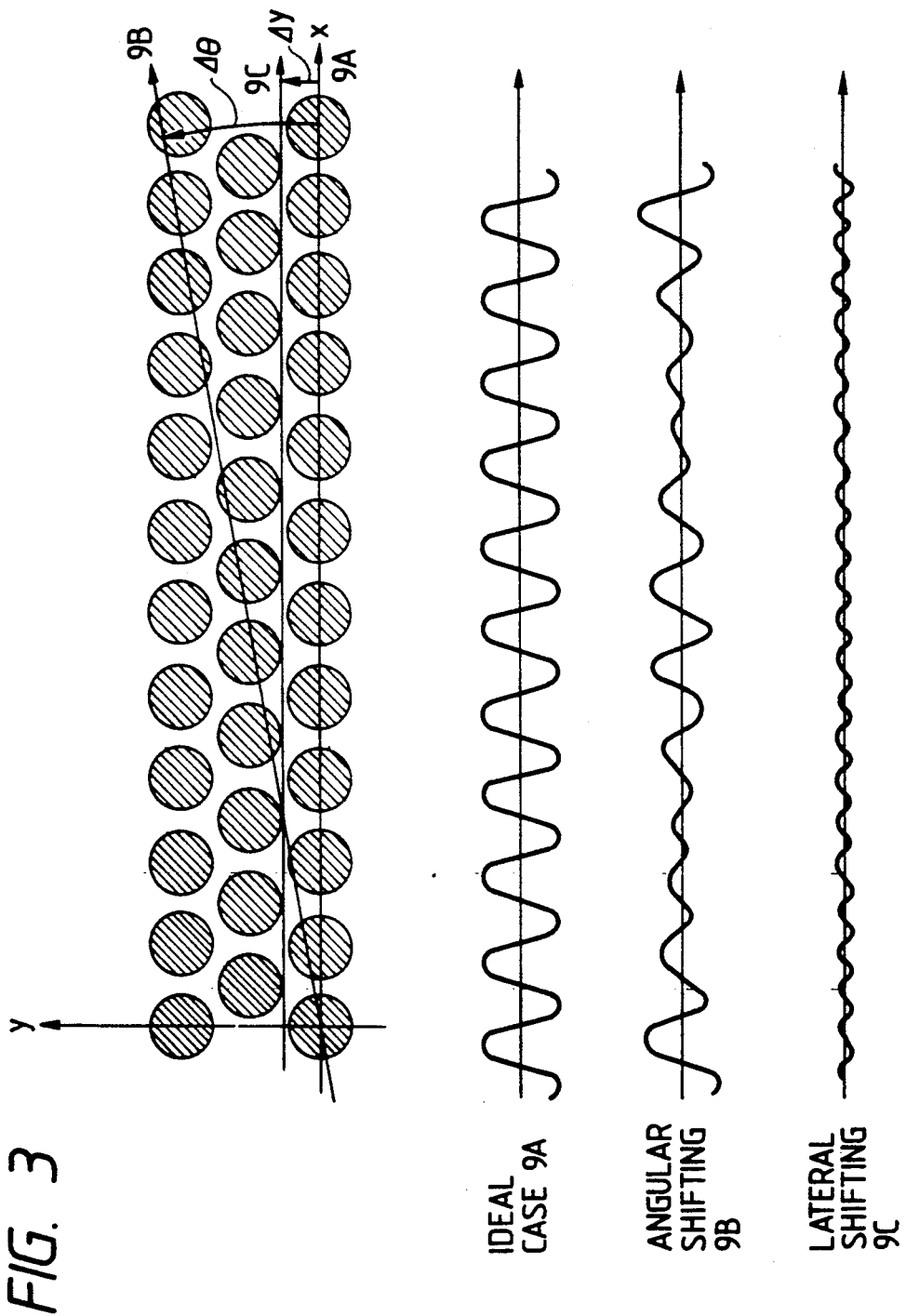
FIG. 3 is an illustration representing detection errors occurring when a two-dimensional scale is used.

The embodiment which will be described later realizes an encoder which has a resolving power and accuracy of 0.1 nanometer and is stable for the local defect and error of the reference scale and disturbances such as vibration and temperature drift, by a displacement amount detecting method utilizing a tunnel current using the oriented molecules on the substrate or the semiconductor superlattice structure as a one-dimensional reference scale particularly in the detection of the amount of relative displacement of two bodies. That is, if for example, molecules periodically oriented on a substrate at intervals of 1 nanometer in a certain one-dimensional direction is used as the reference scale, there is provided a relative displacement detection resolving power of 1 nanometer and further, by interpolation by phase division, measurement is effected at a resolving power of 0.1 nanometer. Also, the angular shifting and lateral shifting as shown in FIG. 3 do not provide any detection error in a one-dimensional reference scale. Accordingly, two one-dimensional reference scales orthogonal to each other are provided on one body, whereby it becomes possible to detect the displacement between two bodies in the x and y directions, i.e., the two-dimensional relative displacement of the two bodies, by two probes provided on the other body.

Materials usable as such a one-dimensional reference scale include (1) oriented molecules of liquid crystal on a substrate, (2) J associate of organic molecules in Langmuir Blodgett's film, and (3) superlattice structure in semiconductor.

Figure 4:
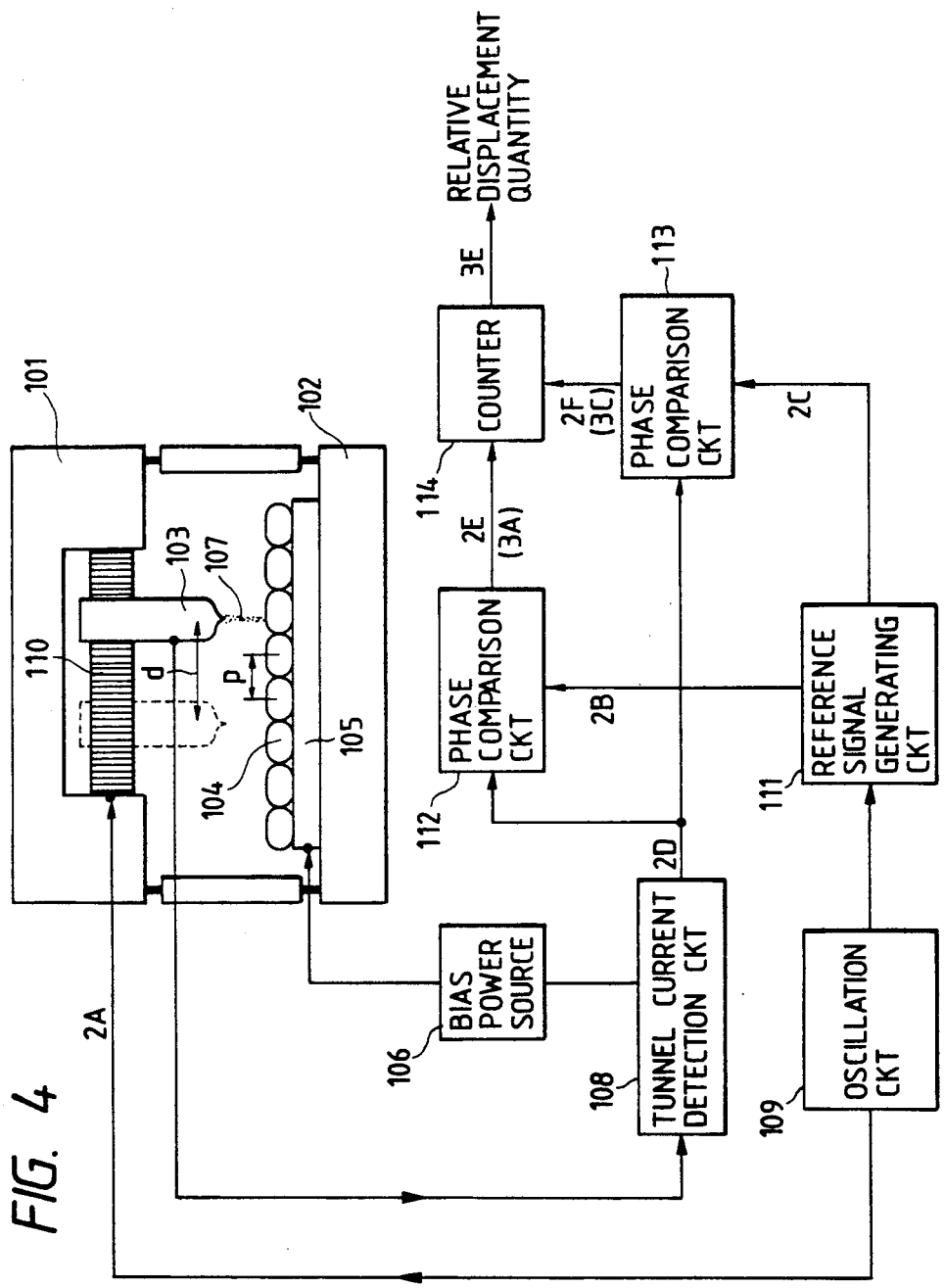
FIG. 4 shows the construction of an encoder utilizing tunnel current detection using a one-dimensional reference scale according to a first embodiment of the present invention.
Figure 5:
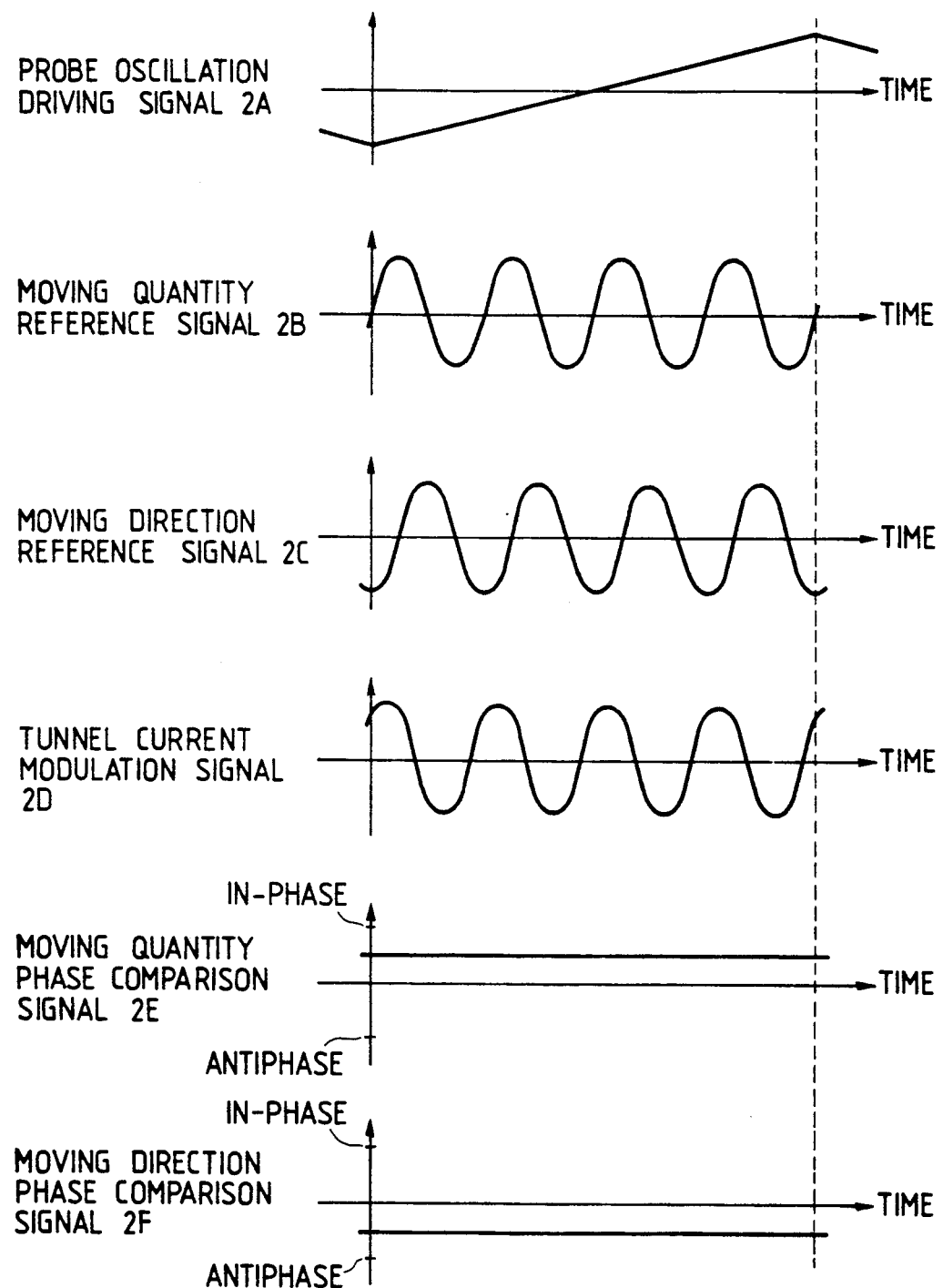
FIGS. 5 and 6 show the waveforms of signals obtained in the various constituent portions of FIG. 4.
Figure 6:
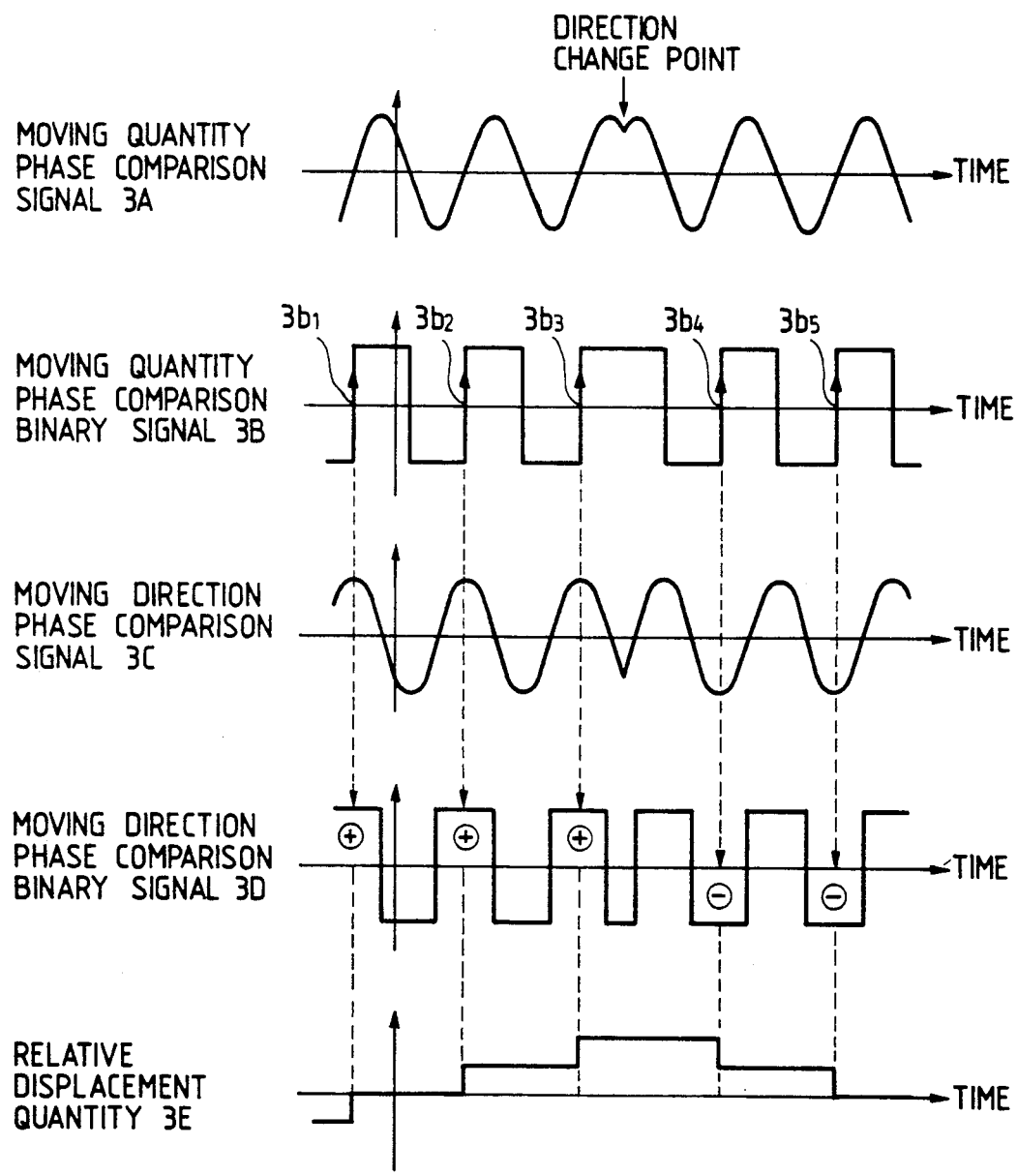

FIG. 4 shows the construction of an encoder according to an embodiment of the present invention, and FIGS. 5 and 6 show signals obtained in the various constituent portions of the apparatus of FIG. 4.

In FIG. 4, an object 101 and an object 102 are installed so as to be displaceable relative to each other only in the lateral direction (the left to right direction in the plane of the drawing sheet), and an electrically conductive probe 103 is provided in the object 101, and an electrically conductive substrate 105 having a one-dimensional periodic structure 104 of period P provided on the surface thereof is provided as a one-dimensional reference scale on the object 102. A bias voltage is applied between the probe 103 and the substrate 105 by a bias electric power source 106, and the tip end of the probe 103 and the one-dimensional periodic structure 104 on the substrate are brought close to each other to such a degree ($\leq 1$ nanometer) that a tunnel current 107 flows therebetween.

During measurement, the tunnel current 107 is detected by a tunnel current detection circuit 108. By a probe vibration driving signal 2A which is a triangular wave of frequency f output from an oscillation circuit 109 and probe vibrating means 110, the probe 103 is vibrated at a frequency f and an amplitude d in the direction of relative displacement of the object 101 and the object 102. The vibration speed at this time is set to sufficiently greater than the speed of relative displacement of the objects 101 and 102. Instead of the probe 103 being vibrated substrate vibrating means may be provided on the object 102 so that the substrate 105 may be vibrated thereby.

Now, by the oscillation of the probe 103, a modulated component of frequency $$\frac{2d}{p} f$$

resulting from scanning on the periodic structure 104 is superposed on the tunnel current 107 flowing between the probe 103 and the periodic structure 104 on the substrate. Here, when the object 101 and the object 102 are laterally displaced relative to each other, the modulated component of frequency $$\frac{2d}{p} f$$

superposed on the tunnel current 107 causes a phase shift relative to a signal which is the reference (for example, the probe oscillation driving signal 2A of FIG. 5). At this time, one period (phase shift of $2\pi$) of the signal corresponds to the lateral shifting of the probe 103 and the substrate 105 by the period of the periodic structure 104 and therefore, by detecting this phase shift, the amount of relative lateral displacement of the object 101 and the object 102 can be detected. In this case, even if there is a defect of the reference scale such as a structural defect of the periodic structure 104, the waveform of the signal is only partly disturbed and this does not affect the phase shift and therefore, it is difficult for the deterioration of accuracy to be caused by disturbance.

The signal processing system will hereinafter be described. The modulated component of frequency $$\frac{2d}{p} f$$

superposed on the tunnel current 107 is taken out by the tunnel current detection circuit 108 and a filter, whereby there is obtained a tunnel current modulation signal 2D. Here, the amplitude of the probe vibration driving signal 2A applied to the probe vibrating means 110 is adjusted so that $$\frac{2d}{p} = n$$

(n being a natural number), whereby the frequency of the tunnel current modulation signal 2D is made coincident with nf. Further, in a reference signal generating circuit 111, a signal resulting from increasing the frequency of the signal of frequency f from the oscillation circuit 109 by n, and thereafter waveform-converting this signal into a sine wave is output as a moving quantity reference signal 2B, and a signal whose phase has been further shifted from 2B by $\pi/2$ is output a moving direction reference signal 2C. Further, the tunnel current modulation signal 2D and the moving quantity reference signal 2B are phase-compared with each other in a phase comparison circuit 112 to thereby obtain a moving quantity phase comparison signal 2E, and also the tunnel current modulation signal 2D and a moving direction reference signal 2C are phase-compared with each other in a phase comparison circuit 113 to thereby obtain a moving direction phase comparison signal 2F.

Here, when the object 101 and the object 102 are laterally displaced relative to each other, the moving quantity phase comparison signal 2E and the moving direction phase comparison signal 2F cause variations as shown by the signals 3A and 3C of FIG. 6, in conformity with the amount of that relative displacement. These signals 3A and 3C are binarized to thereby obtain a moving quantity phase comparison binary signal 3B and a moving direction phase comparison binary signal 3D as shown in FIG. 6, and by the use of these signals, detection of the amount of relative displacement is effected as follows in a counter 114.

That is, if the sign of the moving direction phase comparison binary signal 3D is + (plus) at the pulse rising points $3b_1, 3b_2$ and $3b_3$ of the moving quantity phase comparison binary signal 3B, the counter 114 adds the pulse number, and if conversely, the sign of the signal 3D is − (minus) at the pulse rising points $3b_4$ and $3b_5$ of the signal 3B, the counter 114 subtracts the pulse number and outputs a relative displacement quantity 3E as shown in FIG. 6.

In the manner described above, one pulse in the counter 114 corresponds to the phase shift by one period of modualation in the tunnel current modulation signal 2D, i.e., the amount of relative displacement of the objects 101 and 102 by the period (P) of the periodic structure 104. Accordingly, if use is made of a reference scale whose period P is known in advance, the amount of relative displacement of the objects 101 and 102 can be detected.

Figure 7:
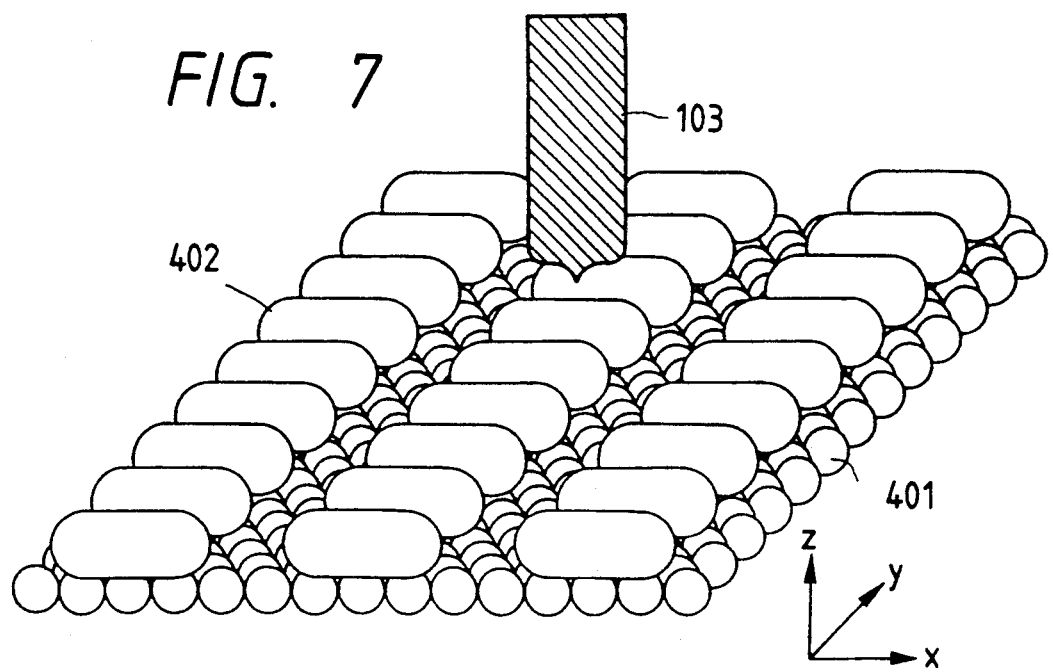
FIG. 7 is a schematic view representing the oriented liquid crystal molecules according to the one-dimensional reference scale of the first embodiment.

FIG. 7 shows a one-dimensional reference scale in the present embodiment.

Here, as the reference scale, use is made of one in which the cleavage plane of graphite single crystal is a substrate 401 and smectic liquid crystal molecules 402 such as 4-cyano-4'-n-octyl-biphenyl are oriented on the surface thereof. The form of the orientation of the smectic liquid crystal molecules 402 on the cleavage plane of the graphite single crystal is such as shown in FIG. 7 wherein the liquid crystal molecules 402 have their molecular axes arranged in the x direction (or have their molecular axes inclined so as to form a predetermined angle with respect to the x direction) and are oriented in the form of layers in parallel to the y-axis. In smectic liquid crystal molecules wherein each molecule has therein a region such as n-alkyl group through which it is difficult for a tunnel current to flow and a region such as biphenyl through which it is easy for a tunnel current to flow, when the probe is scanned in the x direction, the tunnel current flowing therebetween is greatly subjected to modulation in conformity with the regions in each molecule. In contrast, where in the y direction, molecules are oriented close to one another, the tunnel current is not subjected to so great modulation even if the probe is scanned in the y direction. For example, in the case of 4-cyano-4'-n-octyl-biphenyl mentioned previously, the interval between the layers in the x direction is 3 nanometers. Accordingly, if it is used as a reference scale in the x direction, it will provide a one-dimensional scale of 3-nanometer pitch and therefore, no error in relative displacement detection will result from the lateral shifting in the y direction and the angular shifting in the x direction of the probe 103 and the reference scale which occur during the operation of the encoder. Thus, the chemical structure of liquid crystal molecules assume such a form of orientation that they provide a one-dimensional scale on a substrate that is bar-like, and has such a nucleus that two or more six-membered rings are directly connected together or two or more six-membered rings are connected together with such a coupler in which the number of atoms of the main chain is an even number interposed therebetween, and has end groups at the opposite ends thereof. The six-membered rings include, for example, benzene ring, hetero six-membered rings and cyclohexane ring, and the couplers include, for example,

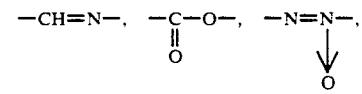

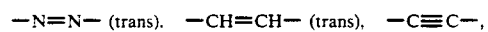

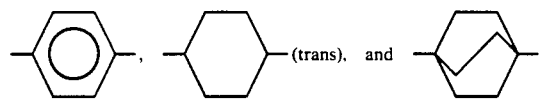

and the end groups include, for example,

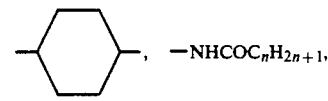

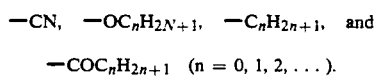

Specific examples of the liquid crystal molecules which can be used in the present embodiment are:

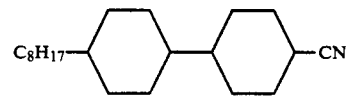

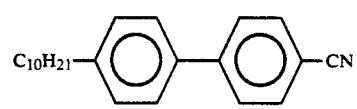

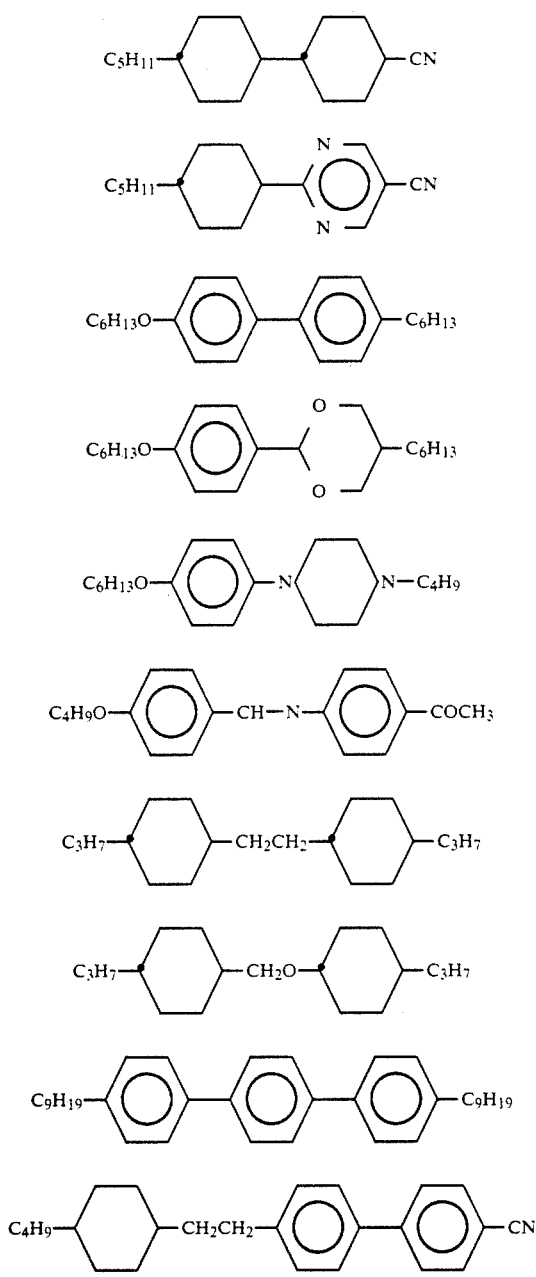

In the present embodiment, an example using the cleavage plane of graphite single crystal has been shown as the substrate, but the substrate may also be the cleavage plane of electrically conductive single crystal such as silicon or gallium arsenide, or an electrically conductive flat plate having flatness of the order of nanometer such as an evaporated surface of gold, platinum, palladium, silver, aluminum or the like and an alloy thereof on a flat glass plate.

The orientation of the liquid crystal molecules 402 onto the substrate 401 can be provided by dripping liquid crystal onto the surface of a clean substrate (in the case of a solid at normal temperature, heat-melting the liquid crystal) and applying it to said surface, or heating it to a temperature within a range in which the liquid crystal is not decomposed, thereby sublimating and evaporating it and depositing it on the surface of the substrate by evaporation.

Figure 8:
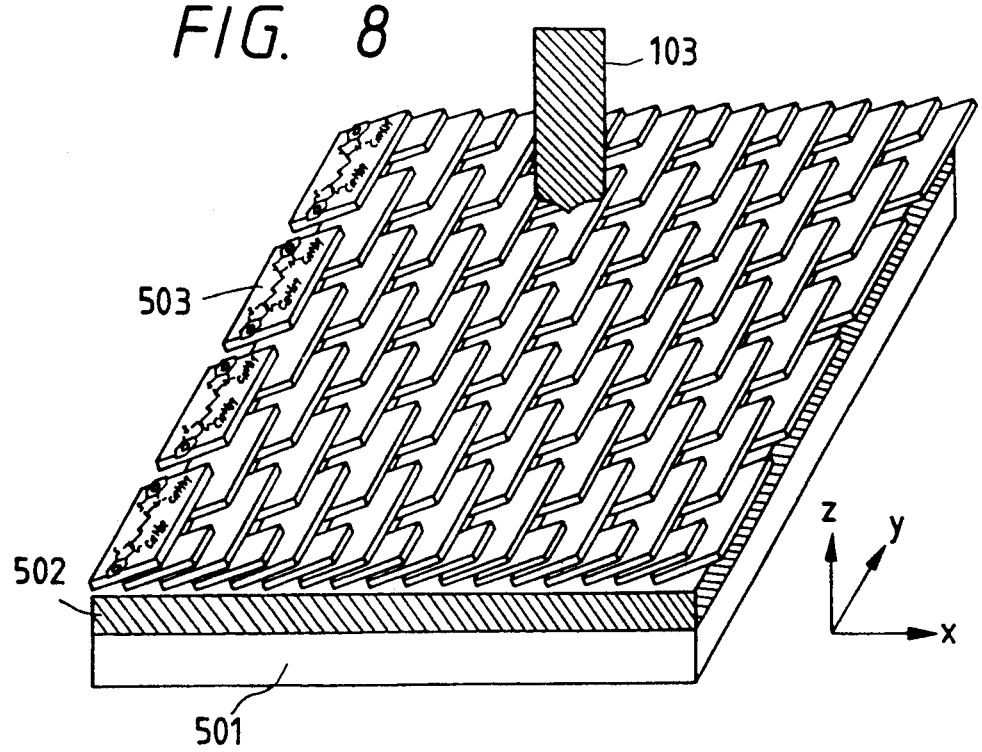
FIG. 8 is a schematic view representing the J associate of dye molecule Langmuir Blodgett's films according to the one-dimensional reference scale of a second embodiment.

FIG. 8 shows a one-dimensional reference scale according to a second embodiment of the present invention. In the following embodiment, the construction and operation of the other portions are the same as those of the first embodiment and therefore need not be described.

This reference scale uses the surface of a gold-evaporated film 502 on a flat glass plate 501 as a substrate, and for example, J-associate of the monomolecular film of cyanine dye

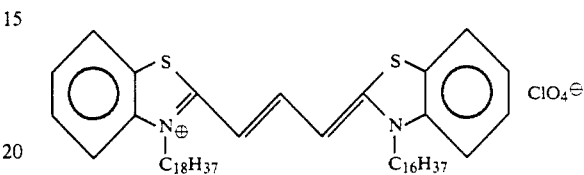

oriented on the surface is used as the reference scale. The form of the orientation of the J-associate of the dye monomolecular film on the surface of the gold-evaporated film 502 is such as shown in FIG. 8 wherein dye molecules 503 have their molecular axes arranged in the y direction and a flat plane containing the benzene rings in the molecules forms a predetermined angle with respect to the surface of the gold-evaporated film 502 and is oriented in the form of layers in parallel to the y-axis. For example, in the case of the cyanine dye mentioned previously, the interval between the layers in the x direction is 0.3 nanometers. Accordingly, if this reference scale is used as a reference scale in the x direction, it will provide a one-dimensional scale of 0.3 nanometer pitch and therefore, no error of relative displacement amount detection will be caused by the lateral shifting in the y direction and the minute angular shifting in the x direction of the probe 103 and the reference scale which occur during the operation of the encoder. The chemical structure of organic molecules assuming such a form of orientation of J-associate which becomes a one-dimensional scale on the substrate is planar, and has an electrical dipole in each molecule by the polarization in the molecule. In the present embodiment, an example using cyanin dye has been shown as such an organic molecule, but other specific examples of the organic molecule are:

xanthene dye

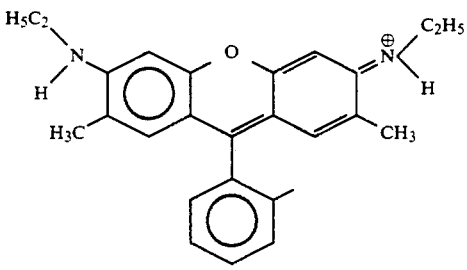

and squarilium dye

-continued

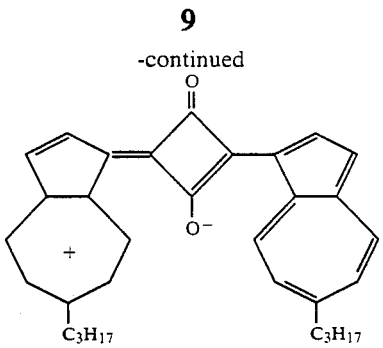

In the present embodiment, an example using the surface of the gold-evaporated film 502 on the flat glass plate 501 has been shown as the substrate, but use may also be made of an electrically conductive flat plate having the flatness of the order of nanometer, such as an evaporated surface of platinum, palladium, silver, aluminum or the like and an alloy thereof, or the cleavage plane of electrically conductive single crystal such as graphite, silicon or gallium arsenic.

The orientation of the J-associate of monomolecular films onto the substrate is provided, for example, by the Langmuir Blodgett's (LB) method. The LB method develops on a water surface an organic substance having a hydrophillic region and a hydrophobic region in each molecule, and applies a suitable surface pressure thereto to thereby produce monomolecular films of organic substance on the water surface, and dips up it onto a substrate to thereby form monomolecular film and cumulative films thereof on the substrate. The single-molecule films of the cyanin dye molecules of the present embodiment scraped onto the substrate by the LB method form the grains of J-associate of the order of 100 nanometers by themselves, but by subjecting them to thermally annealing, the size of the grains can be increased to the order of 10 micrometers.

Figure 9:
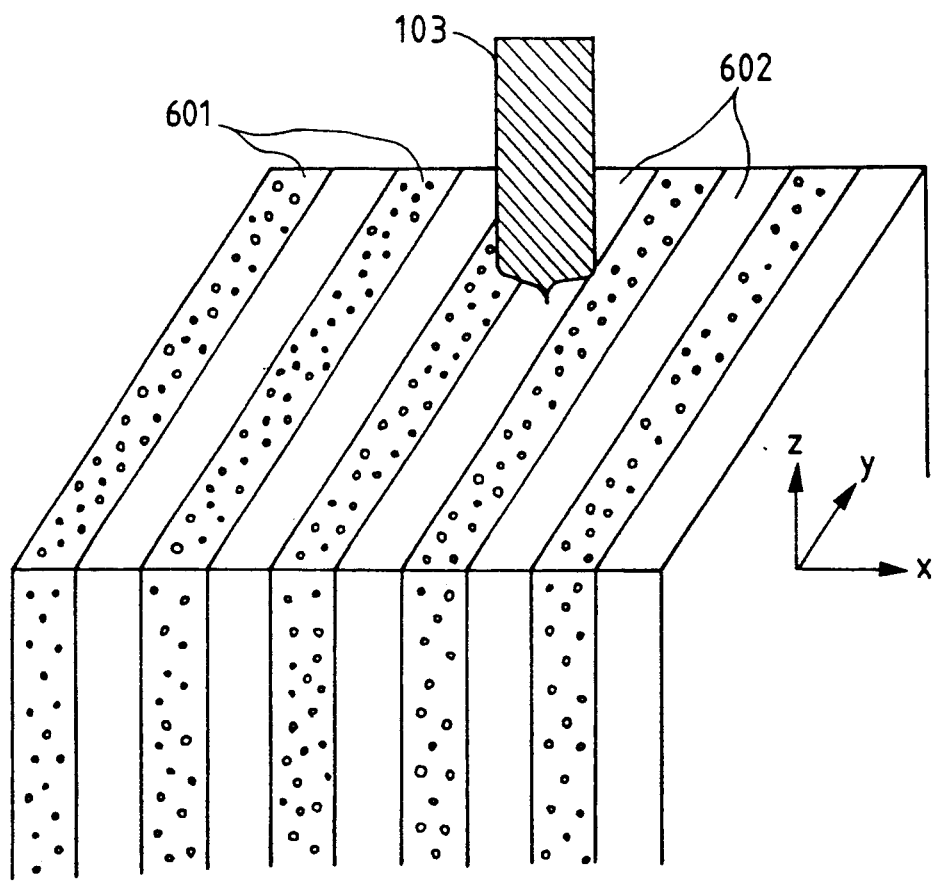
FIG. 9 is a schematic view representing the semiconductor superlattice structure according to the one-dimensional reference scale of a third embodiment.

FIG. 9 shows a one-dimensional reference scale according to a third embodiment of the present invention. As the reference scale, use is made of a surface in which gallium-indium-arsenide layers 601 and indium-phosphide layers 602 have been alternately grown with a film thickness of 5 nanometers over several hundred periods on the cleavage plane of indium-phosphide single crystal (100), and have been cleaved by a plane (110) containing the direction of growth. The cleavage plane is of flat structure, but the structure of the electron distributed state differs between the exposed surface of the cleavage plane of the gallium-indium-arsenide layers 601 and the exposed surface of the cleavage plane of the indium-phosphide layers 602, and even if the distances between the layers 601, 602 and the probe 103 are equal, the values of tunnel currents flowing therethrough differ from each other and therefore, this reference scale can be used as a one-dimensional reference scale having a period double the film thickness in the x direction in FIG. 9 (in the case of the present embodiment, 10 nanometers). Other examples of such superlattice structure include plural combinations of semiconductors and metals such as gallium-arsenic/aluminum-gallium-arsenide and indium-gallium-arsenide/indium-aluminum-gallium-arsenide. The multilayer structure may be alternate layers of three or more kinds of layers. The multi-layer structure formed in this manner is adhesively secured, for example, onto a substrate with the cleavage plane thereof above.

According to the above-described embodiments, in an encoder for effecting the detection of the amount of relative displacement of two bodies, a probe is provided on one of the two bodies, and an oriented liquid crystal molecule or J-associate of Langmuir Blodgett's films on a substrate, or a semiconductor superlattice structure or the like is provided as a one-dimensional reference scale on the other body, and the probe and the reference scale are disposed proximate to each other so that the distance between the tip end of the probe and the reference scale may be 1 nanometer or less, and a tunnel current is flowed between the two and any change in the tunnel current caused by the relative displacement of the two bodies provides an effect having a relative displacement amount detection resolving power of 0.1 nanometer and stable for the local defect and error of the reference scale and disturbances such as vibration and temperature drift.

What is claimed is:

1. An encoder having:
   a reference scale having periodic structure of atoms or molecules in a predetermined direction;
   a probe having a tip facing said reference scale, said probe being used to detect the structural variation information of said periodic structure of said reference scale; and
   relative displacement amount detecting means for detecting the amount of relative displacement between said reference scale and said probe along said predetermined direction from the structural variation information obtained by said probe;
   said reference scale being provided with substantially continuous atomic or molecular structure in which a structural variation is substantially not detected with respect to a direction orthogonal to said predetermined direction.

2. An encoder according to claim 1, wherein said relative displacement amount detecting means has means for applying a voltage between said reference scale and said probe, and tunnel current detecting means for detecting a tunnel current flowing between said reference scale and said probe having the voltage applied therebetween by said voltage applying means, as the structural variation information of said periodic structure, and detects said amount of relative displacement on the basis of the result of the detection by said tunnel current detecting means.

3. An encoder according to claim 2, wherein said reference scale comprises molecule oriented film.

4. An encoder according to claim 3, wherein said molecule oriented film is liquid crystal molecule oriented film.

5. An encoder according to claim 4, wherein said liquid crystal molecule oriented film is one in which smectic liquid crystal molecules are oriented.

6. An encoder according to claim 5, wherein 4-cyano-4'-n-octyl-biphenyl is used as said smectic liquid crystal molecules.

7. An encoder according to claim 3, wherein said molecule oriented film is J-associate of organic molecule Langmuir Blodgett's films.

8. An encoder according to claim 3, wherein said molecule oriented film is one in which J-associate of monomolecular films of organic molecules is oriented.

9. An encoder according to claim 8, wherein said organic molecules are cyanine dye.

10. An encoder according to claim 8, wherein said organic molecules are xanthine dye.

11. An encoder according to claim 8, wherein said organic molecules are squarilium dye.

12. An encoder according to claim 2, wherein said reference scale is formed by a cross-section of multilayer structure in which two or more kinds of electrically conductive materials are layered.

13. An encoder according to claim 12, wherein said multilayer structure is alternate layers of gallium-indium-arsenide and indium-phosphide.

14. An encoder according to claim 12, wherein said multilayer structure is alternate layers of gallium-arsenide and aluminum-gallium-arsenide.

15. An encoder according to claim 12, wherein said multilayer structure is alternate layers of indium-gallium-arsenide and indium-aluminum-gallium-arsenide.

16. A scale member for an encoder for detecting scale information by a probe to thereby detect the amount of relative displacement along a predetermined direction, having:
   a substrate; and
   a reference scale having periodic structure of atoms or molecules in said predetermined direction formed on said substrate, said reference scale being provided with substantially continuous atomic or molecular structure in which a structural variation is substantially not detected with respect to a direction orthogonal to said predetermined direction.

17. A scale member according to claim 16, wherein said reference scale comprises molecule oriented film.

18. A scale member according to claim 17, wherein said molecule oriented film is liquid crystal molecule oriented film.

19. A scale member according to claim 18, wherein said liquid crystal molecule oriented film is one in which smectic liquid crystal molecules are oriented.

20. A scale member according to claim 19, wherein 4-cyano-4'-n-octyl-biphenyl is used as said smectic liquid crystal molecules.

21. A scale member according to claim 17, wherein said molecule oriented film is J-associate of organic molecule Langmuir Blodgett's films.

22. A scale member according to claim 17, wherein said molecule oriented film is one in which J-associate of monomolecular films of organic molecules is oriented.

23. A scale member according to claim 22, wherein said organic molecules are cyanine dye.

24. A scale member according to claim 22, wherein said organic molecules are xanthene dye.

25. A scale member according to claim 22, wherein said organic molecules are squarilium coloring matter.

26. A scale member according to claim 16, wherein said reference scale is formed by a cross-section of multilayer structure in which two or more kinds of electrically conductive materials are layered.

27. A scale member according to claim 26, wherein said multilayer structure is alternate layers of gallium-indium-arsenide and indium-phosphide.

28. A scale member according to claim 26, wherein said multilayer structure is alternate layers of gallium-arsenide and aluminum-gallium-arsenide.

29. A scale member according to claim 26, wherein said multilayer structure is alternate layers of indium-gallium-arsenide and indium-aluminum-gallium-arsenide.

* * * * *

UNITED STATES PATENT AND TRADEMARK OFFICE
CERTIFICATE OF CORRECTION

PATENT NO. : 5,150,035

DATED : September 22, 1992

INVENTOR(S) : HIROYASU NOSE, ET AL.

It is certified that error appears in the above-identified patent and that said Letters Patent is hereby corrected as shown below:

On title page,
IN [56] REFERENCES CITED

Under OTHER PUBLICATIONS, "Jul" should read --Jul.--.

COLUMN 1

Line 26, "election" should read --electron--.
    Line 27, "beana" should read --beam-- and
              "processing)," should read --processing,--.
    Line 39, "STM)" should read --STM).--.
    Line 49, "Sett. 49" should read --Lett. 49-- and
              "So" should read --So,--.

COLUMN 2

Line 62, "J associ-" should read --J-associ- --.

COLUMN 3

Line 18, "molecule oriented" should read
              --molecule-oriented--.
    Line 19, "molecule oriented" should read
              --molecule-oriented--.
    Line 20, "molecule oriented" should read
              --molecule-oriented--.
    Line 60, "J associate" should read --J-associate--.

COLUMN 4

Line 24, "vibrated" should read --vibrated,--.

UNITED STATES PATENT AND TRADEMARK OFFICE
CERTIFICATE OF CORRECTION

PATENT NO. : 5,150,035
DATED : September 22, 1992
INVENTOR(S) : HIROYASU NOSE, ET AL.

It is certified that error appears in the above-identified patent and that said Letters Patent is hereby corrected as shown below:

COLUMN 9

Line 29, "dips up it" should read --dips it up--.
   Line 30, "film" should read --films--.

COLUMN 10

Line 12, "bodies" should read --bodies,--.

Signed and Sealed this

Sixteenth Day of November, 1993

Attest:

BRUCE LEHMAN

Attesting Officer     Commissioner of Patents and Trademarks